UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

ORGANIC CHEMICAL PROCESS.

1,191,880. Specification of Letters Patent. Patented July 18, 1916.

No Drawing. Application filed March 18, 1916. Serial No. 85,021.

*To all whom it may concern:*

Be it known that I, CARLETON ELLIS, a citizen of the United States, and a resident of Montclair, in the county of Essex and State of New Jersey, have invented certain new and useful Improvements in Organic Chemical Processes, of which the following is a specification.

This invention relates to a method of manufacturing certain intermediate compounds such as are employed in the manufacture of dyestuffs and the like and relates particularly to a method of treating the sulfonic acids of various aromatic derivatives such as the products derived by treating benzol, naphthol and the like with sulfuric acid to form mono, di or other sulfonated products.

Many synthetic operations involving the manufacture of intermediates call for sulfonation and various alkali "fusions" likewise frequently are employed such for example as the fusion the sodium salt of naphthalene sulfonic acid with caustic soda or potash in the preparation of naphthol. From the naphthalate which is formed the naphthol is liberated by the action of carbon dioxid or a strong acid such as sulfuric acid. The treatment with carbon dioxide, while enabling the alkali to be recovered is somewhat difficult to carry out and requires extensive equipment for the purpose. Sulfuric acid is therefore often used for liberating naphthol or other aromatic hydroxy body. On the other hand an excess of sulfuric acid commonly is required in the sulfonating operation. Under the common practice this is removed by means of lime and soda treatment accompanied by extensive washing and drying, oftentimes involving the concentration of a great bulk of dilute solution.

By the present process the number of operations may be reduced and the process simplified by indirectly employing the sulfonic acid, containing as it usually does an excess of sulfuric acid, to liberate the aromatic material from the alkali melt. This may be accomplished through the agency of a salt such as sodium sulfate by reacting with the sulfonic acid, forming the sodium salt and sodium bisulfate, and using the latter as the sole or partial acid material to set free the aromatic hydroxy body from the "melt." For example the compound to be sulfonated, such for example as benzol, toluol, naphthalene or other aromatic bodies is treated with concentrated sulfuric acid such as 66° or 98% acid or with fuming sulfuric acid or mixtures of these while being agitated vigorously in closed kettles; fitted with reflux condensers in case a volatile body is being treated. When the sulfonation has proceeded to the desired extent and when circumstances permit, the mixed sulfonic acid and free sulfuric acid are added to the dissolved melt of any of the fusion operations referred to and the aromatic hydroxy bodies thereby liberated are separated either by allowing the batch to stand until such separation takes place, or if desired extraction may be made with naphtha or other suitable solvent and the benzol subsequently removed from the extract material. At the same time the alkali salt of the sulfonic acid is formed and may be suitably separated.

The proportion of water which may be added to the fusion should be kept as low as possible in order to avoid handling a large bulk of solution, and to reduce loss of product in the aqueous vehicle. However, different bodies require different handling and the strength of solution is to be adjusted with reference to the solubilities of the compounds which are being thus processed.

The alkali sulfonate is collected and if desired any excess of sodium sulfate may be removed and the batch may then be dried, pulverized if necessary, and introduced in fusion kettles containing a suitable amount of fused caustic soda or potash. A small amount of water may be present to lower the temperature of fusion.

By another and preferred modification of the process the excess of sulfuric acid is removed from the sulfonic acid and the latter converted into the sodium salt by treatment with sodium sulfate thereby forming bisulfate of soda which is separated and may be used to neutralize or acidify a portion of all of the alkali fusion material. For example, benzol is sulfonated with an excess of sulfuric acid, any unchanged benzol removed and the acid material treated with a concentrated solution of sodium sulfate or a mixture of sulfate and sulfite. The latter may be the solution, concentrated if desired, obtained by neutralization or acidification of the melt in a later stage of the process. Sodium benzene sulfonate is formed and is salted out. Chilling aids the separation. The strength of the sulfate solution preferably should be such as to minimize the tendency to carry down any sulfate or bisulfate. The alkali sulfonate is separated from the mother liquor by filtration or centrifuging. If desired it may be washed with a saline solution. The alkali sulfonate is then dried and is ready for fusion with caustic alkali. It is added in small portions to an excess of fused alkali and the melt is then cooled, crushed and dissolved in as small an amount of water as possible. The mother liquor obtained as above is added to give moderate acidification and the aqueous layer separated from the oily layer. The aqueous solution is saved to be used for treatment of the sulfonic acid material as above described. If a large excess of caustic alkali is used in the fusion stage so that an insufficient amount of mother liquor is available for complete neutralization of the melt a quantity of sulfuric acid sufficient for the purpose may be used to supplement the mother liquor.

The reactions involved in the foregoing are, roughly stated:—

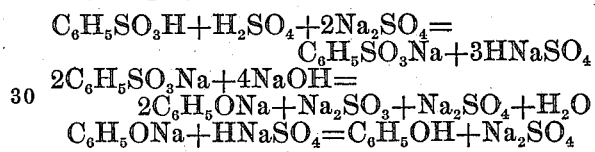

As an excess of caustic soda preferably is used in carrying out the second reaction a larger amount of bisulfate actually is used than is represented by the third equation. A certain amount of sulfite or bisulfite is present and allowance is to be made therefor.

In sulfonating the initial material various strengths of acid may be used as stated. For mono sulfonic acid preferably acid of 66° or 98% is employed at the beginning of the sulfonation, and after the operation has been in progress for a time fuming sulfuric acid may be introduced as required to complete the sulfonation. Or the fuming acid or oleum may be introduced with the weaker acid. The proportion of fuming acid or oleum may be introduced with the weaker acid. The proportion of fuming acid of, say, 15 to 20% free sulfuric anhydrid may, for example, in some cases be about one-third by volume of the total acid employed. By adding the oleum gradually to take up the water as liberated by the reaction the best results as generally obtained.

By further modification of the process the benzol or similar material is sulfonated with only a slight excess of strong acid preferably using sufficient amount of fuming sulfuric acid to obtain as complete conversion to the sulfonic acid as possible and to leave only a slight excess of the free sulfuric acid. The excess of the acid may be removed by the sodium sulfate reaction referred to or if small in amount the entire sulfonated mass may be neutralized with sodium carbonate derived from a later operation and the sodium benzene sulfonate with small amounts of sodium sulfate, due to the presence of the excess of acid in the sulfonated product, is dried, fused with alkali and dissolved in water and may then be treated with sulfuric acid or if desired with carbon dioxid using the latter preferably under pressure. Gas containing a high proportion of carbon dioxid acts more readily on the alkali compound to form the alkali carbonate than with leaner gas such as products of combustion. By employing products of combustion under pressure or other gases richer in carbon dioxid such as those obtained from lime kilns, the reaction may be carried to completion and sodium carbonate formed which may be used to neutralize the sulfonated material derived in the first stage of the operation. This eliminates the necessity of causticizing the sodium carbonate to produce caustic soda for the fusion stage and thereby enables the use of electrolytic caustic soda for the fusion stage, which is desirable.

What I claim is:—

1. The process of making an alkali salt of an aromatic sulfonic acid which comprises sulfonating aromatic material to form the sulfonic acid and in reacting on the resulting sulfonic acid with an alkali melt containing an alkali salt of an aromatic hydroxy body.

2. The process of making a sodium salt of an aromatic sulfonic acid which comprises sulfonating aromatic material to form the sulfonic acid and in reacting on said sulfonic acid with an alkali melt containing the sodium salt of an aromatic hydroxy body.

3. The chemical process which comprises sulfonating an aromatic hydrocarbon with strong sulfuric acid maintained in an anhydrous or a substantially anhydrous condition and continuing the action of said acid until substantially complete reaction with said aromatic hydrocarbon is obtained, in neutralizing the sulfonated material with alkali comprising sodium carbonate, in fusing the dried sodium sulfonate material with caustic soda, in passing carbon dioxid containing gases into an aqueous solution of the fused material; whereby sodium carbonate is formed, in separating the sodium carbonate liquors and employing these to neutralize the acid sulfonate.

CARLETON ELLIS.